United States Patent [19]

Machida

[11] Patent Number: 4,816,292
[45] Date of Patent: Mar. 28, 1989

[54] METHOD OF PREPARING HEXAGONAL FERRITE ELEMENT

[75] Inventor: Hajime Machida, Tokyo, Japan
[73] Assignee: Ricoh Company, Ltd., Tokyo, Japan
[21] Appl. No.: 135,516
[22] Filed: Dec. 18, 1987

Related U.S. Application Data

[62] Division of Ser. No. 15,021, Feb. 17, 1987, abandoned.

[30] Foreign Application Priority Data

Feb. 14, 1986 [JP] Japan ................... 61-030116

[51] Int. Cl.$^4$ .................... H01F 10/02; B05D 3/06
[52] U.S. Cl. ........................ 427/38; 427/128; 427/129; 427/130; 427/131; 427/132
[58] Field of Search ............ 427/38, 128–132

[56] References Cited

U.S. PATENT DOCUMENTS

| 4,544,602 | 10/1985 | Kobayashi et al. ........... 428/900 |
| 4,562,105 | 12/1985 | Machida et al. ............. 428/900 |
| 4,670,322 | 6/1987 | Nakamura et al. ........... 428/900 |
| 4,670,323 | 6/1987 | Nakamura et al. ........... 428/900 |
| 4,690,861 | 9/1987 | Nakamura et al. ........... 428/900 |

FOREIGN PATENT DOCUMENTS 3443049 6/1985 Fed. Rep. of Germany .
164303 8/1985 Japan .
164304 8/1985 Japan .
164305 8/1985 Japan .

Primary Examiner—Bernard Pianalto
Attorney, Agent, or Firm—Oblon, Fisher, Spivak, McClelland & Maier

[57] ABSTRACT

A hexagonal ferrite element comprising a hexagonal ferrite film layer and a substrate for supporting the ferrite layer is prepared by applying on the substrate a metal-ion solution comprising an iron (II) ion and at least one ion selected from the group consisting of $Ba^{2+}$, $Sr^{2+}$, $Pb^{2+}$, $La^{3+}$ and $Ca^{2+}$, with the pH of the solution set at 7 or more, thereby oxidizing the iron (II) ion contained in the metal-ion solution to iron (III) ion. For controlling the magneto-optical characteristics of the produced hexagonal ferrite film, other ions such as $Co^{2+}$, $Co^{3+}$, $Al^{3+}$, $In^{3+}$ and $Ti^{4+}$ may be added to the above metal ion solution, thereby replacing part of iron atoms contained in the ferrite film by such atoms added in the form of ion. Further, for a more controlled and efficient production of the ferrite film, an oxidizing liquid for oxidizing the iron ion, $Fe^{2+}$, contained in the metal-ion solution, to $Fe^{3+}$ can be used by supplying the oxidizing liquid to the substrate concurrently with or after the application of the metal ion solution.

19 Claims, 1 Drawing Sheet

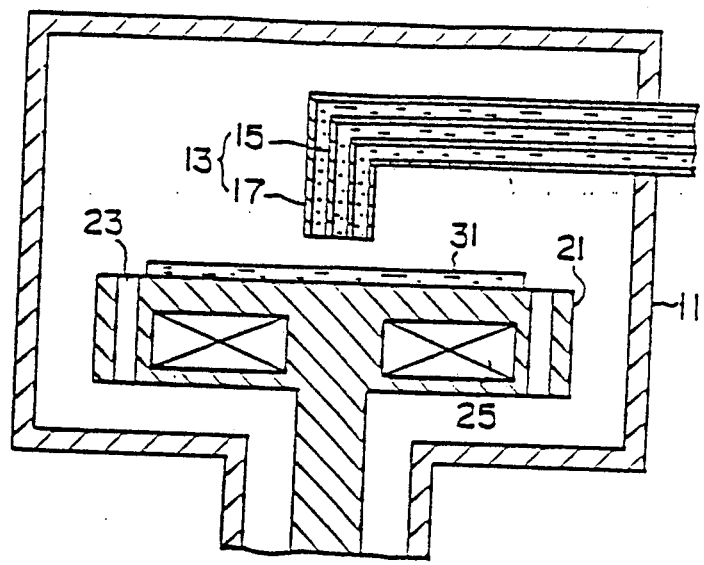

METHOD OF PREPARING HEXAGONAL FERRITE ELEMENT

This application is a division of application Ser. No. 015,021, filed on Feb. 17, 1987, now abandoned.

BACKGROUND OF THE INVENTION

The present invention relates to a hexagonal ferrite element comprising a hexagonal ferrite film layer and a substrate for supporting thereon the ferrite film layer, for example, for use in a magnetic memory disc and a magneto-optical memory disc, and to a method of preparing the same.

Conventionally, magnetic recording is performed by magnetizing a magnetic layer, comprising as the main components a ferromagnetic powder such as an iron oxide powder and a binder resin, formed on a non-magnetic substrate such as a plastic film, in the direction parallel to the surface of the magnetic layer. However, in such a magnetic recording medium, even if it is tried to increase the recording density, there is a limit to the increase of the recording density due to the demagnetizing field generated within the magnetic layer.

Recently, in order to eliminate the shortcoming of the above recording method, there has been proposed a perpendicular magnetic recording method in which a magnetic layer having an axis of easy magnetization oriented in the direction perpendicular to the surface of the magnetic layer is used and the magnetic layer is magnetized in the perpendicular direction. This magnetic recording method is suitable for recording with high density because the demagnetizing field within the magnetic layer decreases as the recording density is increased. Under such circumstances, a number of studies have been conducted on such magnetic recording method.

As perpendicular magnetic materials for the above method, a variety of materials have been proposed. For example, an amorphous alloy consisting of a rare earth element and a transition metal, such as Tb—Fe, has been proposed. Of a number of such materials, hexagonal ferrite is considered to be one of the most suitable materials for use in magnetic memory disc and magneto-optical memory disc. This is because it is an oxide and therefore very stable at relatively high temperatures and humidities, and its coercive force and Curry temperature can be controlled by replacing part of the iron atoms contained in the ferrite with another atom such as Co and Ti as proposed in Japanese Laid-Open Patent Applications Nos. 60-158604 and 60-211904.

However, when a hexagonal ferrite film is formed by sputtering or by vacuum evaporation, it is necessary that the substrate temperature be raised to very high temperatures, for instance, to about 500° C. or more. Therefore, it is necessary to use a heat resistant, expensive substrate, such as a substrate made of a silicon wafer, gallium garnet gadolinium (GGG), heat resistant glass, or a heat-resistant metal.

SUMMARY OF THE INVENTION

It is therefore an object of the present invention to provide a hexagonal ferrite element comprising a hexagonal ferrite film layer formed on a substrate whose softening point is not higher than about 500° C., such as a plastic substrate.

Another object of the present invention is to provide a method of preparing the above hexagonal ferrite element at low temperatures.

These objects of the present invention can be achieved by applying on the substrate a metal-ion solution comprising an iron (II) ion and at least one ion selected from the group consisting of $Ba^{2+}$, $Sr^{2+}$, $Pb^{2+}$, $La^{3+}$ and $Ca^{2+}$, with the pH of the solution set at 7 or more, namely at neutrality or on an alkaline side, thereby oxidizing the iron (II) ion, $Fe^{2+}$, contained in the metal-ion solution, to $Fe^{3+}$ by the oxygen in the air or in the metal-ion solution.

Accordingly, the hexagonal ferrite film layer of the thus produced hexagonal ferrite element comprises Fe and at least one element selected from the group consisting of Ba, Sr, Pb, La and Ca.

In order to control the magneto-optical characteristics of the produced hexagonal ferrite element, other ions, such as $Co^{2+}$, $Co^{3+}$, $Al^{3+}$, $In^{3+}$ and $Ti^{4+}$, can be added to the above metal ion solution, thereby replacing part of iron atoms contained in the ferrite film layer by such atoms added in the form of ion.

In the above hexagonal ferrite element, the layer comprises Fe, at least one element selected from the group consisting of Ba, Sr, Pb, La and Ca, and, for instance, an element such as Co, Al, In and Ti.

In order to form the hexagonal ferrite film layer in a controlled manner on the substrate, an oxidizing liquid for oxidizing the iron ion, $Fe^{2+}$, contained in the metal-ion solution, to $Fe^{3+}$ can be used by supplying the oxidizing liquid to the substrate concurrently with or after the application of the metal ion solution.

Further, for efficiently forming the hexagonal ferrite film layer on the substrate, the surface of the substrate can be subjected to a plasma treatment, or a sputtering treatment by which, for instance, a metal oxide thin layer can be coated on the surface of the substrate.

Furthermore, in order to improve the crystalline orientation of the hexagonal ferrite film layer, the film layer can be subjected to a microwave treatment or a laser beam annealing.

As mentioned previously, according to the present invention, a hexagonal ferrite element can be prepared at low temperatures, so that a substrate whose softening point is not higher than about 500° C., for instance, a plastic substrate, can be used. Therefore, the hexagonal ferrite film formed on a plastic substrate can be used, for instance, as vertical magnetic recording medium and magneto-optical recording medium, for example, in the form of a floppy disc, card or tape instead of the conventional floppy disc or tape for use with a magnetic head.

As a matter of course, the method of preparing the hexagonal ferrite element according to the present invention can be used for preparing a hexagonal ferrite film layer formed on a conventional heat resistant substrate such as a heat resistant glass plate.

Even when such a conventional heat resistant substrate is employed, the present invention is advantageous in production cost and production efficiency over conventional sputtering and vacuum evaporation methods because the ferrite element can be produced at significantly lower temperatures than in such conventional method.

BRIEF DESCRIPTION OF THE DRAWING

The single FIGURE is a schematic cross-sectional view of an apparatus for preparing an hexagonal ferrite element according to the present invention.

DETAILED DESCRIPTION OF THE PREFERRED EMBODIMENTS

The present invention will now be explained in detail with reference to the accompanying drawing.

The single FIGURE is a schematic cross-sectional view of an apparatus 11 for preparing a hexagonal ferrite element according to the present invention.

The apparatus 11 is substantially the same as a conventional spin coater, comprising a turntable 21 with an inner hater 25 as shown in the figure. In the circumferential portion of the turntable 21, there are formed drain holes 23. A substrate (not shown) is placed on the upper surface of the turntable 21.

A metal-ion aqueous solution comprising an iron (II) ion and at least one ion selected from the group consisting of $Ba^{2+}$, $Sr^{2+}$, $Pb^{2+}$, $La^{3+}$ and $Ca^{2+}$ is supplied onto the substrate on the turntable 21 from an inner pipe 15 of a double pipe 13 provided above the turntable 21. Concurrently with the application of the metal-ion aqueous solution, an oxidizing liquid for oxidizing the iron ion, $Fe^{2+}$, contained in the metal-ion solution to $Fe^{3+}$ is applied to the above-mentioned aqueous solution from an outer pipe 17 of the double pipe 13, so that a thin layer of the aqueous solution 31 is formed on the turntable 21 and the iron (II) ion contained in the aqueous solution is considered to be oxidized to an iron (III) ion.

Thereafter, the aqueous solution is evaporated to dryness under application of heat thereto, when necessary under increased pressure, thereby leaving a hexagonal ferrite behind in the form of a thin film on the substrate.

When the above metal-ion aqueous solution is used, it is preferable that an oxygen gas contained therein be completely eliminated therefrom before use when the above-mentioned oxidizing liquid is employed, for instance, by preparing the metal-ion aqueous solution by using water from which an oxygen gas has been eliminated.

As a matter of course, when water is employed for preparation of the oxidizing liquid, it is also preferable to eliminate an oxygen gas from the water before preparation of the oxidizing liquid.

In the formation of the above hexagonal ferrite film layer, it is considered that $Fe^{2+}$ in the form of $Fe(OH)^+$ is first adsorbed at the surface of the substrate, and the adsorbed $Fe(OH)^+$ is then oxidized to $Fe^{3+}$, so that the above hexagonal ferrite film is formed.

In the present invention, the above aqueous solution is preferably employed as the metal-ion solution. In this solution, however, water-soluble solvents such as methanol and ethanol can also be used in combination with water.

In order to promote the formation of the hexagonal ferrite film layer or the crystallization thereof, it is preferable to heat the substrate and/or the metal-ion solution, more preferably under increased pressure. In the present invention, however, the temperature within the apparatus 11 is still much lower than the conventional temperature. Specifically, the preferable temperature is about 350° C. or less. When the crystallization of the ferrite film layer is insufficient, the film is subjected to a microwave treatment, an infrared radiation treatment, a laser beam application treatment or an ultra-violet radiation treatment, thereby promoting the crystallization of the ferrite film layer.

In order to promote the adsorption of the iron (II) ion to the substrate, or the above-mentioned oxidation reaction of the iron ion, it is preferable to subject the surface of the substrate to a plasma treatment. In the plasma treatment, a plasma generated at glow discharging, corona discharging and microwave discharging can be employed. The gases for the formation of the plasma are oxygen, argon, nitrogen and neon. When a plastic substrate, for example, made of polyethylene terephthalate, teflon, polypropylene or polycarbonate, is subjected to the plasma treatment in the mixed gases of oxygen and argon, the surface of the substrate is activated and provided with the property of easily wetting with water, so that the adsorption of the iron ion contained in the metal-ion solution can be promoted.

Alternatively, the adsorption of the iron ion to the surface of the substrate and the above-mentioned oxidation reaction can be promoted by treating the surface of the substrate with an oxide such as a metal oxide or with a metal.

This treatment can be performed by sputtering and vacuum evaporation. Specific examples of such oxides are ZnO, $Fe_3O_4$ ferrite, Co ferrite, MnZn ferrite, NiZn ferrite, CaO, MgO, $ZrO_2$, $Al_2O_3$, CrO, CuO, NiO, $SiO_2$, $TiO_2$, and examples of a metal are Cu and Fe.

As the materials for the above-mentioned substrate, plastics such as polyethylene terephthalate, teflon, polypropylene, polycarbonate, nylon, epoxy resin, aromatic polyamide, polyimide, polyamide imide, polybenzimidazole, polyphenylene triazole, polyethersurfone and polymethyl methacrylate; metals such aluminum, stainless steel; and ceramics such as glass, crystallized glass, $Si_3N_4$, $SiO_2$, MgO and $Al_2O_3$ can be employed.

As the metal-ion solution for forming the hexagonal ferrite film, an aqueous solution of metal hydroxides containing iron (II) ion and at least one ion selected from the group consisting of a $Ba^{2+}$, $Sr^{2+}$, $Pb^{2+}$, $La^{3+}$ and $Ca^2$, with the pH of the solution set 7 or more, is preferably employed.

Part of the iron atoms contained in the hexagonal ferrite film can be replaced by other ions, so that the magneto-optical characteristic of the hexagonal ferrite film, for instance, the coercive force, Curie temperature and Faraday rotation angle thereof, can be controlled or adjusted.

In the present invention, the hexagonal ferrite film layer can be formed by use of the above-mentioned solution. Therefore, the composition of the hexagaonal ferrite film layer can be easily changed as desired.

Specific examples of an ion by which part of iron (II) ion can be replaced are as follows: $Co^{2+}$, $Co^{3+}$, $Mn^{2+}$, $Mn^{3+}$, $Rh^{3+}$, $Rh^{4+}$, $Zn^{2+}$, $Cu^{2+}$, $Ni^{2+}$, $Mo^{6+}$, $Mo^{5+}$, $V^{4+}$, $V^{5+}$, $Mg^{2+}$, $Ga^{3+}$, $Al^{3+}$, $Cr^{3+}$, $In^{3+}$, $Sc^{3+}$, $Gd^{3+}$, $Tb^{3+}$, $Bi^{3+}$, $Y^{3+}$, $Sb^{3+}$, $Ti^{4+}$, $Sn^{4+}$, $Ce^{4+}$, $Zr^{4+}$, $Ta^{5+}$, $Nb^{5+}$ and $Ru^{4+}$.

As the oxidizing liquid, a solution containing an $O_2/N_2$ mixture gas, an aqueous solution of $H_2O_2$, and an aqueous solution of $NaNO_2$ can be employed. To these oxidizing liquid, an agent working as buffer, such as ammonium acetate, may be added.

With reference to the following examples, the present invention will now be explained in detail. The feature ot this invention will become apparent in the course of the following description of the examples, which are given for illustration of the invention and are not intended to be limiting thereof.

EXAMPLE 1

By using water from which an oxygen gas was completely eliminated with nitrogen, 600 ml of a metal-ion aqueous solution with the following formulation was prepared, with addition thereto of a small amount of ammonium acetate as shown below to make the solution neutral or slightly alkaline:

| Metal Ion Aqueous Solution | |
| --- | --- |
| | Concentration M (mole/liter) |
| $FeCl_2.3.5H_2O$ | 0.024 |
| $BaCl_2$ | 0.002 |
| $CH_3COONH_4$ | Small amount |

Apart from the above aqueous solution, an oxidation liquid was prepared by dissolving $NaNO_2$ with a concentration of 0.6 g/liter in water from which an oxygen gas was completely eliminated in the above-mentioned manner, with addition thereto of a small amount of ammonium acetate to make the liquid substantially neutral.

By use of the apparatus as shown in FIG. 1, the aqueous solution was applied with a rate of 10 ml/minute from the inner pipe 15 onto a substrate made of aluminum with a thin layer of MnZn ferrite coated thereon. Concurrently with the application of the aqueous solution, the above prepared oxidation liquid was applied with a rate of 10 ml/minute to the substrate.

In the course of the application of the solution and the oxidation liquid, the pressure within the apparatus was raised so that the temperature of the aqueous liquid mixture of the metal ion aqueous solution and the oxidation liquid was maintained at about 300° C., and the substrate was also heated to about 300° C. The application of the two liquids was continued, so that a barium ferrite film layer having a formula of $BaO5.8\ (Fe_2O_3)$ with a thickness of 0.5 $\mu$m was formed on the aluminum substrate coated with the MnZn ferrite film.

The crystalline orientation of the C plane (008) of this barium ferrite film layer, $\Delta\theta_{50}$, was 3 degrees.

EXAMPLE 2

Example 1 was repeated except that the substrate employed in Example 1 was replaced by a plastic substrate made of an aromatic polyimide (Trade Mark "Kapton" made by Du Pont Toray Co., Ltd.) which was subjected to a plasma treatment by the Rf sputtering method for 10 minutes under the conditions that an Ar gas pressure was $5 \times 10^{-3}$ Torr and an $O_2$ gas pressure was $3 \times 10^{-4}$ Torr, whereby a barium ferrite film layer, having a thickness of 1 $\mu$m, with the same composition as the ferrite film layer obtained in Example 1, was prepared.

The thus prepared ferrite film layer was subjected to a microwave treatment of 2.4 GHz for 30 minutes for promoting the crystallization of the film layer. As a result, the crystalline orientation of this film layer was improved to 2 degrees.

EXAMPLE 3

Example 1 was repeated except that the aqueous solution and the oxidation liquid employed in Example 1 were respectively replaced by 800 ml of the following aqueous solution, with addition thereto of a small amount of NaOH to make the solution slightly alkaline, and by the following aqueous solution of $NaNO_2$, whereby a barium ferrite film layer having a formula of $BaO.5.5(Co_{0.15}Ti_{0.15}Fe_{1.7}O_3)$, with a thickness of 0.5 $\mu$m, was obtained.

| Metal Ion Aqueous Solution | |
| --- | --- |
| | Concentration M (mole/liter) |
| $FeCl_2.3.5H_2O$ | 0.024 |
| $BaCl_2$ | 0.002 |
| $CoCl_2.6H_2O$ | 0.001 |
| $TiCl_2$ | 0.005 |
| NaOH | Small amount |

| Oxidation Liquid | |
| --- | --- |
| | Concentration (g/liter) |
| $NaNO_2$ | 1.5 |
| NaOH | Small amount |

EXAMPLE 4

Example 1 was repeated except that the aqueous solution and the oxidation liquid employed in Example 1 were respectively replaced by 1000 ml of the following aqueous solution, with addition thereto of a small amount of NaOH to make the solution slightly alkaline, and by the same aqueous solution of $NaNO_2$ as that employed in Example 3, and further that the substrate employed in Example 1 was replaced by a polycarbonate substrate which was subjected to the same plasma treatment as in Example 2, with the temperatures of the mixture of the aqueous solution and the oxidation liquid and the substrate set at about 90° C., whereby a barium ferrite film layer having a formula of $Ba_{0.4}La_{0.6}O.6(Co_{0.1}Al_{0.2}Fe_{1.7}O_3)$, with a thickness of 0.3 $\mu$m, was obtained.

| Metal Aqueous Solution | |
| --- | --- |
| | Concentration M (mole/liter) |
| $FeCl_2.3.5H_2O$ | 0.024 |
| $BaCl_2$ | 0.002 |
| $LaCl_2$ | 0.001 |
| $CoCl_2.6H_2O$ | 0.001 |
| $AlCl_3$ | 0.001 |
| NaOH | Small amount |

The thus prepared barium ferrite film layer was subjected to annealing by exposing the film layer to Ar laser beam of 50 mW in a spiral form. As a result, the crystalline orientation of the ferrite film layer was improved to 1.5 degrees.

EXAMPLE 5

Using water from which an oxygen gas was completely eliminated with nitrogen, 600 ml of a metal ion aqueous solution with the following formulation was prepared, with addition thereto of a small amount of ammonium acetate as shown below to make the solution neutral or slightly alkaline:

| Metal Ion Aqueous Solution | |
| --- | --- |
| | Concentration of M (mole/liter) |
| $FeCl_2.3.5H_2O$ | 0.024 |
| $SrCl_2$ | 0.002 |
| $InCl_3$ | 0.002 |
| $CH_3COONH_4$ | Small amount |

Apart from the above, an oxidation liquid was prepared by dissolving a mixture gas of $O_2/N_2$ (the partial pressure of oxygen being 1%) in the water from which an oxygen gas was completely eliminated in the above-mentioned manner, with addition thereto of a small amount of ammonium acetate to make the liquid substantially neutral.

By use of the apparatus shown in FIG. 1, a barium ferrite film layer having a formula of $SrO.5.8(In_{0.05}Fe_{1.95}O_3)$ with a thickness of 0.7 μm was prepared in the same manner as in Example 1.

The thus prepared ferrite film layer was exposed to a microwave treatment of 2.4 GHz for 10 minutes for promoting the crystallization of the film layer. As the result, the crystalline orientation of this film layer was improved to 2 degrees.

EXAMPLE 6

A Ni-Zn ferrite thin film was formed with a thickness of 2000 Å on a glass substrate by sputtering, with the substrate temperature maintained at 200° to 300° C., whereby a substrate was prepared.

Using the same metal ion aqueous solution and the oxidation liquid as those employed in Example 3, a barium ferrite film layer having a formula of $BaO.5.5(Co_{0.15}Ti_{0.15}Fe_{1.7}O_3)$ was formed with a thickness of 0.5 μm on the above prepared substrate.

The thus prepared barium ferrite film layer was subjected to a microwave treatment of 2.4 GHz for 30 minutes for promoting the crystallization of the film layer. Thereafter, a Cr thin film was deposited with a thickness 1000 Å on the film by vacuum evaporation, followed by forming a groove-shaped Cr guide track on the barium ferrite film layer by a conventional photoresist method, whereby a magneto-optical recording disc was prepared.

The thus prepared magneto-optical recording disc was subjected to a recording test under the conditions that the power of the semiconductor laser for recording was 10 mW at the recording surface, the frequency thereof was 1 MHz, the magnetic field for recording was 100 Oe, and the line speed thereof was 5 m/sec, thereby forming bits having a bit length of 2 μm.

The information recorded under the above-mentioned conditions was reproduced under the conditions that the power of the semiconductor laser for reproduction was 5 mW at the recording surface and the line speed thereof was 5 m/sec. As a result, the signals with C/N being 45 dB were reproduced. This result shows that the above prepared magneto-optical recording disc can be satisfactorily used in practice.

EXAMPLE 7

A CuO thin film was deposited with a thickness of 1000 Å on a substrate made of an aromatic polyimide (Trade Mark "Kapton" made by Du Pont Toray Co., Ltd.) by vacuum evaporation.

Using the metal ion aqueous solution and the oxidation liquid employed in Example 4, a barium ferrite film layer having the formula of $Ba_{0.4}La_{0.6}O.6(Co_{0.1}Al_{0.2}Fe_{1.7}O_3)$ was formed with a thickness of 0.5 μm on the polyimide substrate.

By the conventional photoresist method, a groove-shaped Cr uide track was formed on the barium ferrite film layer. Thereafter He-Ne laser of 50 mW was applied to the barium ferrite film layer through the substrate along the Cr guide track, whereby the crystallization of the barium ferrite film layer under the Cr guide track was promoted, whereby an magneto-optical recording disc was prepared.

The above prepared magneto-optical recording disc was also subjected to the same recording and reproduction tests as in Example 6. The results were as good as those obtained in Example 6.

What is claimed is:

1. A method of preparing a hexagonal ferrite element comprising a hexagonal ferrite film layer and a substrate for supporting said hexagonal ferrite film layer thereon comprising:

applying to said substrate a metal-ion solution comprising an iron (II) ion, $Fe^{2+}$, and at least one ion selected from the group consisting of $Ba^{2+}$, $Sr^{2+}$, $Pb^{2+}$, $La^{3+}$ and $Ca^{2+}$, with the pH of said solution set at least 7, thereby oxidizing said iron (II) ion, $Fe^{2+}$, to iron (III) ion, $Fe^{3+}$.

2. The method of preparing a hexagonal ferrite element as claimed in claim 1, wherein the oxidizing of said iron (II) ion to said iron (III) ion is performed by the oxygen contained in the air.

3. The method of preparing a hexagonal ferrite element as claimed in claim 1, wherein the oxidizing of said iron (II) ion to said iron (III) ion is performed by the oxygen contained in said metal-ion solution.

4. The method of preparing a hexagonal ferrite element as claimed in claim 1, further comprising the step of subjecting said substrate to a plasma treatment prior to the application of said metal-ion solution to said substrate.

5. The method of preparing a hexagonal ferrite element as claimed in claim 1, further comprising the step of coating on said substrate a layer made of a material selected from the group consisting of a metal oxide and a metal prior to the application of said metal-ion solution to said substrate.

6. The method of preparing a hexagonal ferrite element as claimed in claim 1, further comprising the step of subjecting said ferrite film layer to a treatment for promoting the crystallization of said ferrite film layer after the formation of said ferrite film layer.

7. A method of preparing a hexagonal ferrite element comprising a hexagonal ferrite film layer and a substrate for supporting said hexagonal ferrite film layer comprising:

applying to said substrate a metal-ion solution comprising an iron (II) ion and at least one ion selected from the group consisting of $Ba^{2+}$, $Sr^{2+}$, $Pb^{2+}$, $La^{3+}$ and $Ca^{2+}$, from which an oxygen gas has been eliminated therefrom, with the pH of said solution set at least 7, and concurrently with or after the application of said metal-ion solution to said substrate, applying to said substrate an oxidizing liquid for oxidizing said iron (II) ion contained in said metal-ion solution to an iron (III) ion.

8. The method of preparing a hexagonal ferrite element as claimed in claim 7, wherein said oxidizing liquid is selected from the group consisting of a solution comprising mixed gases of $O_2/N_2$, a solution comprising $H_2O_2$, and a solution comprising $NaNO_2$.

9. The method of preparing a hexagonal ferrite element as claimed in claim 7, further comprising the step of subjecting said substrate to a plasma treatment prior to the application of said metal-ion solution to said substrate.

10. The method of preparing a hexagonal ferrite element as claimed in claim 7, further comprising the step of coating on said substrate a layer made of a material selected from the group consisting of a metal oxide and a metal prior to the application of said metal-ion solution to said substrate.

11. The method of preparing a hexagonal ferrite element as claimed in claim 7, further comprising the step of subjecting said ferrite layer to a treatment for promoting the crystallization of said ferrite film layer after the formation of said ferrite film layer.

12. A method of preparing a hexagonal ferrite element comprising a hexagonal ferrite layer and a substrate for supporting said hexagonal ferrite film layer comprising:

applying to said substrate a metal-ion solution comprising an iron (II) ion, $Fe^{2+}$, at least one ion selected from the group consisting of $Ba^{2+}$, $Sr^{2+}$, $Pb^{2+}$, $La^{3+}$ and $Ca^{2+}$, and at least one ion selected from the group consisting of $Co^{2+}$, $Co^{3+}$, $Mn^{2+}$, $Mn^{3+}$, $Rh^{3+}$, $Rh^{4+}$, $Zn^{2+}$, $Cu^{2+}$, $Ni^{2+}$, $Mo^{6+}$, $Mo^{5+}$, $V^{5+}$, $Mg^{2+}$, $Ga^{3+}$, $Al^{3+}$, $Cr^{3+}$, $In^{3+}$, $Sc^{3+}$, $Gd^{3+}$, $Tb^{3+}$, $Bi^{3+}$, $Y^{3+}$, $Sb^{3+}$, $Ti^{4+}$, $Sn^{4+}$, $Ce^{4+}$, $Zr^{4+}$, $Ta^{5+}$, $Nb^{5+}$ and $Ru^{4+}$, with the pH of said solution set at least 7, thereby oxidizing said iron (II) ion, $Fe^{2+}$, to an iron (III) ion, $Fe^{3+}$.

13. The method of preparing a hexagonal ferrite element as claimed in claim 12, wherein the oxidizing of said iron (II) ion to said iron (III) ion is performed by the oxygen contained in the air.

14. The method of preparing a hexagonal ferrite element as claimed in claim 12, wherein the oxidizing of said iron (II) ion to said iron (III) ion is performed by the oxygen contained in said metal-ion solution.

15. The method of preparing a hexagonal ferrite element as claimed in claim 12, further comprising the step of subjecting said substrate to a plasma treatment prior to the application of said metal-ion solution to said substrate.

16. The method of preparing a hexagonal ferrite element as claimed in claim 12, further comprising the step of coating on said substrate a layer made of a material selected from the group consisting of a metal oxide and a metal prior to the application of said metal-ion solution to said substrate.

17. The method of preparing a hexagonal ferrite element as claimed in claim 12, further comprising the step of subjecting said ferrite layer to a treatment for promoting the crystallization of said ferrite film layer after the formation of said ferrite film layer.

18. A method of preparing a hexagonal ferrite element comprising a hexagonal ferrite film layer and a substrate for supporting said hexagonal ferrite film layer comprising:

applying to said substrate, a metal-ion solution comprising an iron (II) ion, at least one ion selected from the group consisting of $Ba^{2+}$, $Sr^{2+}$, $Pb^{2+}$, $La^{3+}$ and $Ca^{2+}$, and at least one ion selected from the group consisting of $Co^{2+}$, $Co^{3+}$, $Mn^{2+}$, $Mn^{3+}$, $Rh^{3+}$, $Rh^{4+}$, $Zn^{2+}$, $Cu^{2+}$, $Ni^{2+}$, $Mo^{6+}$, $Mo^{5+}$, $V^{5+}$, $Mg^{2+}$, $Ga^{3+}$, $Al^{3+}$, $Cr^{3+}$, $In^{3+}$, $Sc^{3+}$, $Gd^{3+}$, $Tb^{3+}$, $Bi^{3+}$, $Y^{3+}$, $Sb^{3+}$, $Ti^{4+}$, $Sn^{4+}$, $Ce^{4+}$, $Zr^{4+}$, $Ta^{5+}$, $Nb^{5+}$ and $Ru^{4+}$, from which an oxygen gas has been eliminated therefrom, with the pH of said solution set at least 7, and concurrently with or after the application of said metal-ion solution to said substrate, applying to said substrate an oxidizing liquid for oxidizing said iron (II) ion contained in said metal-ion solution to an iron (III) ion.

19. The method of preparing a hexagonal ferrite film as claimed in claim 18, wherein said oxidizing agent is selected from the group consisting of a solution comprising mixed gases of $O_2/N_2$, a solution comprising $H_2O_2$, and a solution comprising $NaNO_2$.

* * * * *